No. 744,956. PATENTED NOV. 24, 1903.
H. J. CASE.
HARVESTER.
APPLICATION FILED APR. 11, 1901.
NO MODEL. 2 SHEETS—SHEET 1.

Witnesses:
E. A. Volk
F. F. Schuyler

Henry J. Case  Inventor
By Wilhelm Bonner
Attorneys

No. 744,956. PATENTED NOV. 24, 1903.
H. J. CASE.
HARVESTER.
APPLICATION FILED APR. 11, 1901.
NO MODEL. 2 SHEETS—SHEET 2.
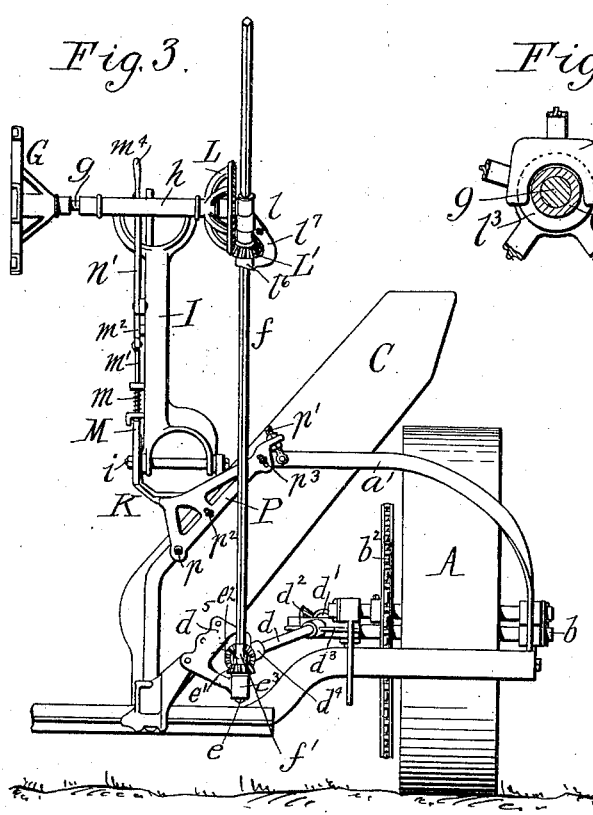
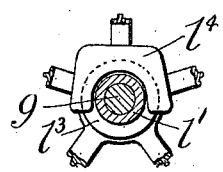
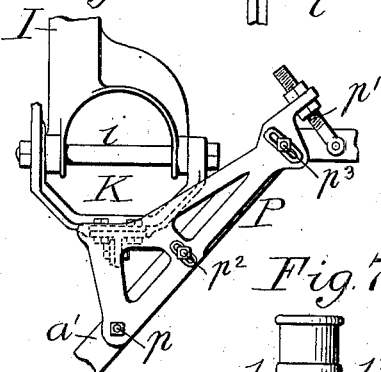
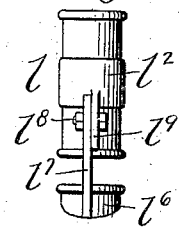
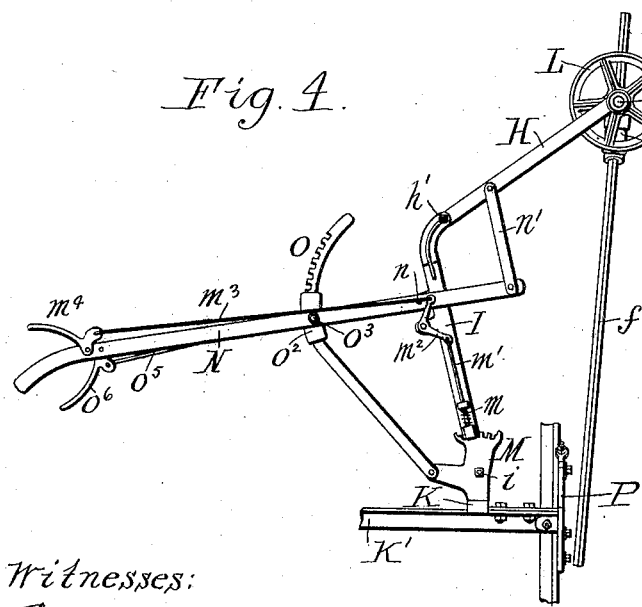
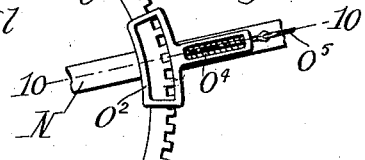
Witnesses:
E. A. Volk
F. F. Schwinger
Henry J. Case
Inventor.
By Wilhelm Bonner
Attorneys.

No. 744,956. Patented November 24, 1903.

UNITED STATES PATENT OFFICE.

HENRY J. CASE, OF OWASCO, NEW YORK, ASSIGNOR TO ADRIANCE, PLATT & COMPANY, OF POUGHKEEPSIE, NEW YORK.

HARVESTER.

SPECIFICATION forming part of Letters Patent No. 744,956, dated November 24, 1903.

Application filed April 11, 1901. Serial No. 55,316. (No model.)

*To all whom it may concern:*

Be it known that I, HENRY J. CASE, a citizen of the United States, and a resident of Owasco, in the county of Cayuga and State of New York, have invented a new and useful Improvement in Harvesters, of which the following is a specification.

This invention relates to the reels of grain-harvesters, and has particularly reference to the devices whereby the reel is rotated and the devices whereby the position of the reel can be adjusted. These reels are usually driven from the second shaft through the crank-shaft and the elevator mechanism, the second shaft being the horizontal shaft, which is arranged transversely in rear of the master-wheel and is driven from the latter. When the reel is driven through the intervention of the elevator mechanism, the speed must be reduced in gearing from the elevator mechanism to the reel, since the reel-arms should travel at about the same speed as the ground-wheels, while the elevator-rollers are required to travel much faster. The increase of speed in gearing from the ground-wheels to the elevator-roller and the subsequent reduction of the speed in gearing from the elevator-roller to the reel involves a loss of power, which I wish to avoid.

One object of my invention is to drive the reel by means of shafts and gear-wheels without the intervention of the elevator mechanism and without impairing the adjustability of the reel.

Another object of my invention is to simplify the devices whereby the reel is adjustably supported.

Figure 1:
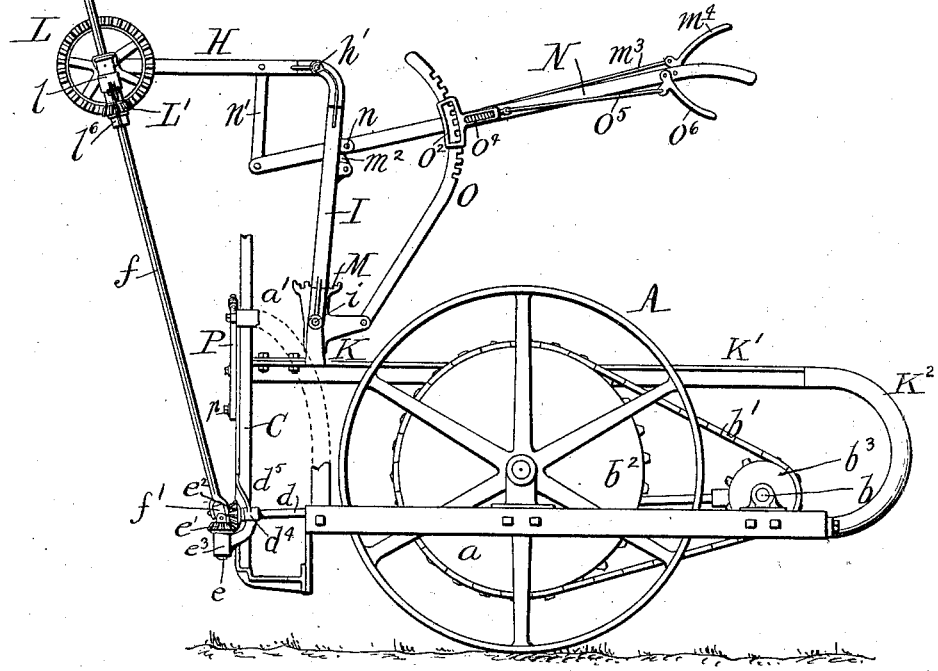
Figure 2:
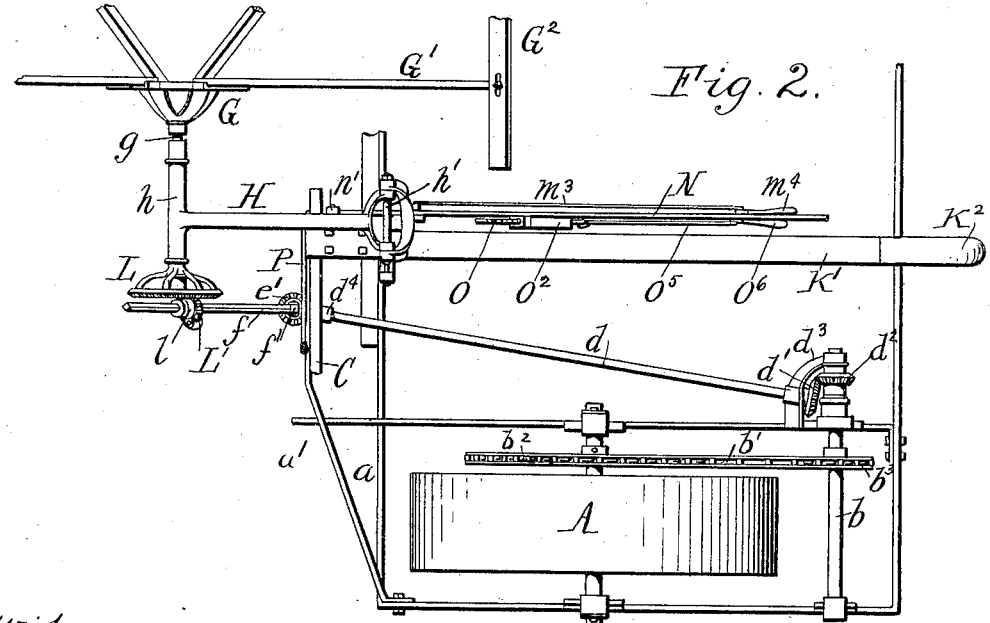

In the accompanying drawings, consisting of two sheets, Figure 1 is a fragmentary side elevation of a harvester provided with my improvements viewed from the stubbleward side. Fig. 2 is a top plan view of the same. Fig. 3 is a front elevation thereof. Fig. 4 is a side elevation of the reel-adjusting devices viewed from the grainward side. Fig. 5 is a vertical section, on an enlarged scale, of the bevel-wheels connecting the reel-shaft with its actuating-shaft. Fig. 6 is a fragmentary sectional view of the hub of the bevel-wheel on the reel-shaft in line 6 6, Fig. 5. Fig. 7 is a front elevation of the bearing connecting the reel-shaft with its actuating-shaft. Fig. 8 is a front elevation of the adjusting device for the base-support of the reel-post. Fig. 9 is an elevation, on an enlarged scale, of the locking-bolt and carrier arranged on the hand-lever. Fig. 10 is a cross-section in line 10 10, Fig. 9.

Like letters of reference refer to like parts in the several figures.

A represents the master-wheel of a grain harvester or binder, $a$ the lower portion of the frame adjacent to this wheel, and $a'$ the upper front portion of the frame. $b$ represents the second shaft arranged, as usual, in rear of the master-wheel and driven from the latter by any suitable means—for instance, by a chain $b'$ and sprocket-wheels $b^2$ $b^3$. C represents the elevator. All of these parts may be of any suitable or well-known construction.

$d$ represents a longitudinal intermediate shaft which transmits motion from the second shaft to the reel and which is arranged between the master-wheel and the elevator. This shaft extends from the second shaft forwardly to the front side of the frame $a$ and is preferably arranged slightly obliquely toward the elevator. This intermediate shaft is geared with the second shaft by any suitable means—for instance, a pair of bevel-wheels $d'$ $d^2$. The intermediate shaft is journaled near its rear end in a bracket $d^3$ or some other suitable support and near its front end in a bearing $d^4$, formed on a bracket $b^5$, which is secured to the elevator-casing C or some other suitable support.

$e$ is a short vertical shaft which is arranged below the front end of the intermediate shaft and driven from the same by a pair of bevel-wheels $e'$ $e^2$. This short shaft is journaled in a bearing $e^3$, also formed on the bracket $d^5$.

$f$ is a long shaft which extends from the vertical shaft $e$ upwardly to the reel and which is connected at its lower end with the vertical shaft by a universal joint $f'$, so as to be movable forwardly and backwardly.

$g$ represents the horizontal reel-shaft, which is journaled in a bearing $h$, formed at the front end of an arm H. The latter is pivoted at its bifurcated rear end by a transverse pivot $h'$ to the upper bifurcated end of a post I, which is pivoted at its foot by a transverse pivot $i$ to a support K. The reel-shaft is provided at its grainward end with the usual spider G, to which are secured the reel-arms G', which carry the reel-bars G².

L is a bevel-wheel which is secured to the stubbleward end of the reel-shaft. The upper portion of the upright shaft $f$ extends past the face of this wheel and engages a pinion L', which meshes with the same. The pinion and gear wheel are held in their relative positions by the following means. (Shown in detail in Figs. 5, 6, and 7.)

$l$ is an elbow-bearing which is composed of an upper horizontal part $l'$, which embraces the end of the reel-shaft, and a vertical part $l^2$, which is arranged in the same plane with the horizontal part and which embraces the pinion and the upright shaft $f$. The horizontal part $l'$ of the bearing is provided at its end with an annular flange $l^3$, which is engaged underneath or behind an overhanging flange $l^4$, formed on the hub of the gear-wheel L. The reel-shaft is then passed through the gear-wheel and inserted in the horizontal part of the bearing and secured to the gear-wheel by a pin $l^5$. The bearing is in this manner connected with the reel-shaft and gear-wheel. The pinion L' is provided with an upwardly-projecting sleeve or elongated hub L², which rotates in the vertical part $l^2$ of the bearing. The latter is provided with a detachable collar $l^6$, which engages against the under side of the pinion and holds the latter in the bearing. This collar is secured to the vertical part $l^2$ of the bearing by an arm $l^7$, projecting upwardly from the collar and attached by a bolt $l^8$ to an upright ear $l^9$, formed on the vertical part $l^2$. The upright shaft $f$ passes loosely through the pinion and its hub or sleeve and is made square or otherwise so constructed that it will drive the pinion in any position in which the pinion may be placed by adjusting the reel up or down and forwardly or backwardly. The pinion is compelled to follow the adjusting movements of the reel-shaft, since it is connected with the same by the elbow-bearing. The universal joint at the lower end of the upright shaft enables the latter to adjust itself to any position of the reel-shaft.

This shaft and gear device for driving the reel is much simpler in construction than the chain-drive usually employed. It operates with comparatively little friction and adapts itself easily to any position of the reel-shaft without causing the parts to bind or spring.

The devices whereby the position of the reel-shaft is adjusted are constructed as follows:

The foot of the post I and the base-support K of the post are bifurcated transversely to furnish a broad support for the pivot of the post.

M is a toothed segment which is formed on the base-support on the grainward side of the post and in which engages a spring-bolt $m$, which is arranged on the side of the post for locking the latter in position on the segment.

N represents the hand-lever whereby the position of the reel-shaft is adjusted. This lever is pivoted to the upper portion of the post by a transverse pivot $n$ and has its short front arm projecting forwardly beyond the post and connected with the reel-supporting arm H by an upwardly-extending rod or link $n'$. By moving the rear end of this lever up or down the arm H and the reel carried thereby are lowered or raised. The locking-bolt $m$ is operated from this hand-lever by a rod $m'$, extending upwardly from the bolt to a bell-crank lever $m^2$, which is pivoted to the post I below the pivot of the hand-lever and a rod $m^3$, which extends from the bell-crank lever to a handle $m^4$, pivoted to the hand-lever, near the handle thereof. Upon releasing this locking-bolt the post I can be swung forwardly or backwardly on its pivot $i$. The hand-lever is held in position to support the reel at the desired elevation by a curved segment O and locking-bolt O'. The segment O is arranged in rear of the post concentric with the pivot $n$ of the hand-lever, or substantially so, and is provided with a downward extension which is pivoted at its lower end to the base-support K in rear of the pivot of the post I, so that this segment can swing forwardly or backwardly with the post. The locking-bolt O', which engages in the segment O, is mounted in a frame or carrier O², which embraces the segment and is arranged on one side of the hand-lever, to which it is attached by a pivot O³. This pivot permits the carrier and the bolt to shift their positions relatively to the lever and adapt themselves to the position of the latter when the lever is moved backward or forward for shifting the position of the post. The carrier O² contains also the spring O⁴, which holds the bolt in engagement with the segment O.

O⁵ represents the rod which connects the bolt O' with the handle O⁶ on the lever by which this bolt is released.

When it is desired to adjust the reel forwardly or backwardly, the locking-bolt $m$ of the post I is released by the handle $m^4$ and the post I is moved forward or backward by the hand-lever N. When it is desired to raise or lower the reel, the locking-bolt O' is released by the handle O⁶ and the arm H is swung up or down by the hand-lever. The adjustment of the post forward and backward and of the reel-supporting arm up or down are effected by the same lever in a very simple and satisfactory manner.

The base-support K of the post I is secured upon a longitudinal bar K', which extends over the elevator. This bar is secured at its rear end by the usual gooseneck K² to the rear portion of the frame and at its front end to an adjustable arm P. The latter is attached to the front portion $a'$ of the frame and is pivoted at its lower end to the frame by a longitudinal pivot $p$ and connected at its upper end to the frame by an adjusting-screw $p'$. The arm is secured in position after having been adjusted by bolts $p^2 p^3$, which pass through slots in the arm. By adjusting the upper end of the arm P the supporting-bar K' is sprung or twisted at its front end, thereby tilting the support K grainward or stubbleward. By raising the upper end of the arm the grainward end of the reel is lowered, and by lowering the upper end of the arm the grainward end is raised. This adjustment of the arm furnishes means for alining the reel with the cutter mechanism.

I claim as my invention—

1. The combination of a master-wheel, a transverse driving-shaft which is driven therefrom, a longitudinal intermediate shaft arranged obliquely on the inner side of the master-wheel, gears connecting said longitudinal shaft at its rear end with said driving-shaft, a short upright shaft arranged at the front end of said longitudinal shaft, gears connecting said longitudinal shaft with said short upright shaft, an upright reel-actuating shaft arranged above said short upright shaft, a universal joint connecting said upright shafts, a driving-pinion adjustably mounted on the upper portion of said upright reel-actuating shaft, and an adjustable horizontal reel-shaft provided with a gear-wheel which meshes with said driving-pinion, substantially as set forth.

2. The combination of the reel-shaft, a bevel-wheel secured to said shaft at a distance from the end thereof, an elbow-bearing comprising a horizontal portion and an upright portion arranged in the same plane, the horizontal portion embracing the end of the reel-shaft which projects beyond said wheel, an external attaching device connecting said elbow-bearing with said wheel, a pinion which meshes with said wheel and which is mounted in the upright portion of said elbow-bearing, and an upright reel-actuating shaft which passes through said pinion and the upright portion of said elbow-bearing, substantially as set forth.

3. The combination with the adjustable reel-shaft, and a bevel-wheel secured thereto and provided with an overlapping flange, of a driving-pinion meshing with said wheel, an elbow-bearing composed of a horizontal portion which receives the reel-shaft and is provided with an annular flange which engages behind said overlapping flange of the bevel-wheel, and of an upright portion which embraces said pinion, and an upright actuating-shaft on which said pinion can move up or down, substantially as set forth.

4. The combination with the adjustable reel-shaft provided with a bevel-wheel, and an upright actuating-shaft, of a connecting elbow-bearing comprising an upright portion and a horizontal portion which is arranged in the same plane with the upright portion and projects from one end thereof, a driving-pinion which is arranged against the opposite end of said upright portion and provided with an elongated hub which is journaled in the same, and a retaining-collar detachably secured to said upright portion and holding the pinion in the same, substantially as set forth.

5. The combination with the reel-post pivoted at its lower end, means for locking said post in position, a reel-arm pivoted at its rear end to the upper end of said post, and the reel mounted on the front end of said arm, of a hand-lever pivoted to said post and connected to said reel-arm, a toothed segment pivoted at its lower end in rear of said post, and a locking-bolt arranged on said lever and engaging said segment, substantially as set forth.

6. The combination with the reel-post pivoted at its lower end, means for locking said post in position, a reel-arm pivoted at its rear end to the upper end of said post, and the reel mounted on the front end of said arm, of a hand-lever pivoted to said post and connected to said reel-arm, a toothed segment pivoted at its lower end in rear of said post, a bolt for locking said lever to said pivoted segment, and a carrier for said bolt which is pivoted to said lever, substantially as set forth.

7. The combination with the reel-post, the reel-arm pivoted to the upper end of said post, and the reel mounted on said arm, of a support to which the post is pivoted, a toothed locking-segment arranged on said support, a locking-bolt arranged on said post and engaging said segment, a hand-lever pivoted to said post and connected with said arm, a toothed segment pivoted in rear of said post, a locking-bolt arranged on said lever and engaging said pivoted segment, and means on said lever for operating both locking-bolts, substantially as set forth.

8. The combination with the reel-post, the reel-arm, the reel mounted on said arm, a hand-lever pivoted to said post, and locking devices for said lever and post connected with said lever, of a base-support to which said post is connected by a transverse pivot, a supporting-frame, a longitudinal pivot connecting the base-support with said frame, and an adjusting device whereby said base-support can be swung about its pivot, thereby raising or lowering the grainward end of the reel, substantially as set forth.

Witness my hand this 2d day of April, 1901.

HENRY J. CASE.

Witnesses:
C. LOUIS PULSIFER,
HOWARD A. SOMERS.